March 30, 1926.
E. D. WESTRIP
GATE VALVE
Filed Jan. 16, 1923
1,578,695
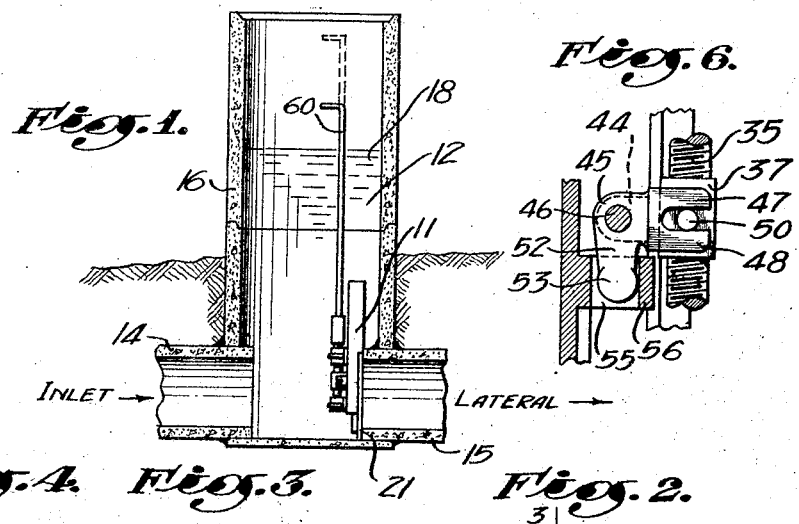
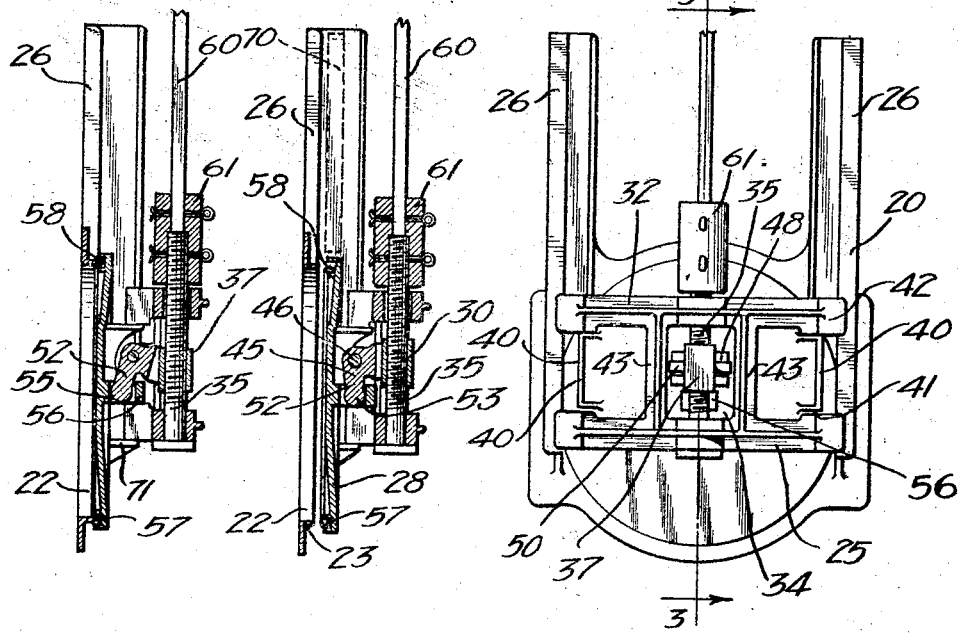
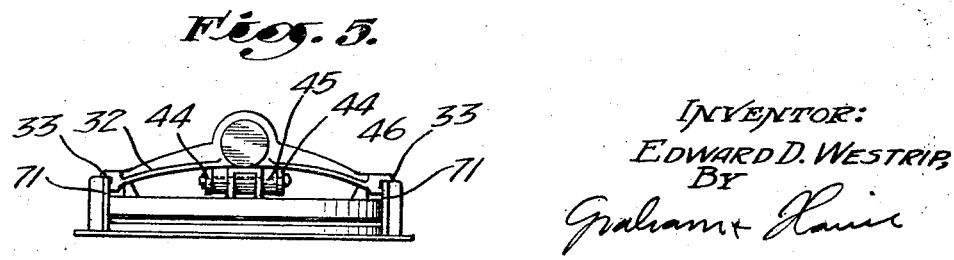
INVENTOR:
EDWARD D. WESTRIP
BY
Graham + Lamic
ATTORNEYS.

Patented Mar. 30, 1926.

BEST AVAILABLE COPY 1,578,695

UNITED STATES PATENT OFFICE.

EDWARD D. WESTRIP, OF POMONA, CALIFORNIA, ASSIGNOR TO THE POMONA MANUFACTURING COMPANY, A CORPORATION OF CALIFORNIA.

GATE VALVE.

Application filed January 16, 1923. Serial No. 613,040.

*To all whom it may concern:*

Be it known that I, EDWARD D. WESTRIP, a citizen of the United States, residing at Pomona, in the county of Los Angeles, State of California, have invented a new and useful Gate Valve, of which the following is a specfication.

My invention relates to gate valves, and is more particularly a gate valve especially suited to the control of the flow of water in irrigation systems.

Several types of gate valves are now employed for this purpose, one of which comprises a plate ground to fit the valve seat and which plate is slid across the valve seat and is forced tightly thereagainst at the end of its movement by the cam formation of the slides in which the closure plate is carried. This valve is a modification of the standard form of double seat gate valve employed in various liquid transfer systems. Another type of valve used for this purpose is provided with a circular gasket which is intended to form a tight seal between the closure plate and the valve seat. It has been found difficult to maintain a tight closure by the use of the first named valve, while with the gasket type valve, the sliding engagement of the closure plate with the seat thereof causes the disruption of the gasket and consequent leakage thereof.

It is an object of my invention to provide a gate valve in which the closure plate thereof is lowered into a position before the valve seat, but is spaced away from the valve seat during its movement into position before the valve seat, and is then moved into engagement with the valve seat in a direction substantially perpendicular to the plane of the valve seat. By this construction, it is possible to employ a gasket whereby a perfect seal may be attained, without subjecting the gasket to sliding contact with the valve seat.

The particular advantages of the invention and further objects thereof will be made evident hereinafter.

Referring to the drawing, which is for illustrative purposes only,

Fig. 1 is a sectional elevational view illustrating one application to which my invention is particularly suited.

Fig. 2 is an enlarged face view of the gate valve shown in Fig 1.

Fig. 3 is a vertical section taken upon the plane representd by the line 3—3 of Fig. 2, showing the closure plate of the valve in position before the seat thereof previous to the movement of the closure plate into sealing engagement with the seat.

Fig. 4 is a section similar to Fig. 3, showing the closure plate in sealing position upon the valve seat.

Fig. 5 is a bottom plan view of Fig. 2.

Fig. 6 is an enlarged view showing in detail the construction of the bell crank employed in the device.

In the application of my invention to the control of flow of water through irrigation systems such as employed in orchards, the gate valve 11 is located in a basin 12 into which conduits 14 and 15 are connected. The basin 12 generally consists of a stand pipe composed of sections of concrete pipe 16, and the inlet and outlet laterals 14 and 15 are comprised of concrete pipes laid under the surface of the ground as shown. Although Fig. 1 shows a basin 12 having one inlet and one outlet thereto, it is customary to employ a single inlet for delivering water into the basin, as indicated at 18, and a number of outlets through which the water is distributed to various parts of the orchard.

The gate valve, as shown in the following figures of the drawing, consists essentially of a cast frame 20 which is secured over the mouth of the lateral 15, as indicated at 21 in Fig. 1, and is provided with an opening 22 therein having an upstanding flange forming a valve seat 23; a carriage 25 which is slidably supported upon parallel vertical slides 26 of the casting 20; a closure plate 28 supported by the carriage in such a manner that it may be employed to seal the opening 22, as shown in Fig. 4, or may be moved out of engagement with the valve seat 23, as shown in Fig. 3, and thereafter lifted clear of the opening 22 by raising the carriage 25 in the slides 26; and means 30 for moving the closure plate 28 laterally into engagement with the seat 23 or away from the seat 23 as desired.

The carriage 25 comprising an H casting having extending legs 32, which are slotted at 33 to engage the slides 26, and has a central opening 34 across which the screw 35 of the operating mechanism 30 extends and in which opening 34 the vertically movable block 37 is situated. The closure plate 28 has formed upon the back thereof a pair of outstanding lugs 40 having parallel faces 41 which extend between the outer ends 42 of the legs 32, thus preventing an upward or downward movement of the closure plate relative to the carriage 25 and providing means whereby the closure plate 28 may be slid laterally with respect to the carriage 25. Extending inwardly from the cross bars 43 of the carriage 25 are lugs 44 between which the bell crank 45 is mounted upon pin 46. The bell crank has the laterally extending arm 47 thereof in the form of forks 48 which extend outwardly on each side of the screw block 37, which is threaded upon the screw 35 and has laterally extending pins 50 which engage the forks 48 as shown in Figs. 2 and 6. The vertical arm 52 of the bell crank 45 has the end thereof of cylindrical formation as shown at 53. This end of the vertical arm 52 rests in a vertical slot 55.

A channel 57 is formed around the edge of the closure plate as shown in Figs. 3 and 4 in which channel a circular gasket member 58 is placed, this gasket being preferably formed of impregnated braid or rope. When the screw 35 is rotated by means of the handle 60, which extends upwardly within the basin 12 and is joined with a screw by means of a sleeve 61, the block 37 may be moved upwardly or downwardly, depending upon the direction of rotation of the screw 35. The vertical movement of the block 37 is transferred through the outwardly extending pins 50 to the lateral arm 47 of the bell crank, thus causing the bell crank to swing upon the shaft 46 and the lower end of the arm 52 of the bell crank 45 to swing through a lateral arc and to move the closure plate 28 in a horizontal plane. Therefore, it will be seen that by suitably rotating the screw 35, through the operation of the handle 60, it is possible to move the block 37 downwardly with the result that the bell crank 45 is so rotated upon the shaft 46 that the closure plate 28 will be slid against the seat 23 of the valve as shown in Fig. 4.

When it is desired to open the valve, the screw is rotated in the opposite direction causing the closure plate 28 to be moved away from the seat 23 into the position apart therefrom, shown in Fig. 3, whereupon the carriage 25 may be lifted in the slides 26 and the closure plate thus lifted into the position indicated by the dotted lines 70 in Fig. 3 entirely clear of the opening 22. Stops 71 are provided at the lower ends of the slides 26 so that when the carriage is lowered in the slides, these stops will bring the closure plate into alignment before the opening. A vertical rotation of the plate 28 through a plane perpendicular to the face thereof is prevented by the engagement of the parallel faces 41 of the outwardly extending lugs 40 with the ends 42 of the legs 32.

The particular advantage of my invention is that by its use all sliding contact of the closure plate 28 with the valve seat 23 is eliminated, owing to the means providing for the lateral movement of the closure plate into engagement with the seat 23. By this arrangement, a gasket may be employed so that a perfect closure of the opening is attained with the result that leakage of the valve is effectually prevented. It is highly desirable to employ gaskets, as where the contact of metal plates is depended upon for closure of a valve, the entrance of sand or other foreign particles between the closure plate and the valve seat prevents perfect closure thereof.

I claim as my invention:

1. In a gate valve of the class described, the combination of: a valve seat; a carrier comprising an H-casting adapted to be moved into position in front of said valve seat; a closure element supported upon said carrier and movable thereupon between pairs of guides extending in a direction substantially perpendicular to the face of said valve seat; and means, comprising a lever actuatable by a vertically movable block, for sliding said closure element, on said perpendicular guide, into engagement with said valve seat.

2. A gate valve, as defined in claim 1, in which said means includes a bell crank lever member engaging said closure element in a manner to force it against said valve seat, and means comprising pins on said block for actuating said member.

3. A gate valve, as defined in claim 1, in which said sliding means comprises also a screw having threaded engagement with said block.

4. A gate valve, as defined in claim 1, in which said means includes a bell crank having one arm thereof in engagement with said closure element, said block being screw-actuated and carrying pins engaging the other arm of said bell crank.

5. In a gate valve of the class described, the combination of: a valve seat; a slide extending parallel to the face of said valve seat; a carrier slidable upon said slide into position in front of said valve seat; a closure plate supported upon said carrier, said closure plate having sliding engagement with said carrier which permits the movement of said closure plate in a direction perpendicular to the face of said valve seat; a lug extending from the back of said closure plate having an opening therein; a bell crank mounted upon said carrier, said bell crank having a plate operating arm and a forked arm, said plate operating arm being in engagement with said slot in said projection upon the back of said closure plate; a screw turnably mounted in said carrier, the axis of said screw being disposed parallel to the face of said valve seat; a block threaded upon the said screw having engagement with the forked arm of said bell crank for swinging said bell crank so as to move said closure plate in a direction perpendicular to the face of said valve seat; and a handle for revolving said screw.

In testimony whereof, I have hereunto set my hand at Los Angeles, California, this 10th day of January, 1923.

EDWARD D. WESTRIP.